(12) United States Patent
Wong et al.

(10) Patent No.: US 12,355,479 B2
(45) Date of Patent: Jul. 8, 2025

(54) DEVICE HAVING AN INNER SEALING SURFACE FORMING CONTOURS AROUND SCREW BOSSES

(71) Applicant: MOTOROLA SOLUTIONS, INC., Chicago, IL (US)

(72) Inventors: Liong Siung Wong, Bayan Lepas (MY); Pedram Djavadkhani, Georgetown (MY); Chun Wen Ooi, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 411 days.

(21) Appl. No.: 18/081,042

(22) Filed: Dec. 14, 2022

(65) Prior Publication Data

US 2024/0204817 A1 Jun. 20, 2024

(51) Int. Cl.
*H04B 1/3888* (2015.01)

(52) U.S. Cl.
CPC .................. *H04B 1/3888* (2013.01)

(58) Field of Classification Search
CPC .................................................... H04B 1/3888
USPC ......................................................... 455/90.3
See application file for complete search history.

(56) References Cited

U.S. PATENT DOCUMENTS

| 4,673,780 | A | * | 6/1987 | Kenway | ............... | H01H 13/063 |
| | | | | | | 200/302.2 |
| 4,737,173 | A | * | 4/1988 | Kudirka | ................ | B01D 46/10 |
| | | | | | | 55/471 |
| 5,755,590 | A | * | 5/1998 | Zoiss | ...................... | H04M 1/15 |
| | | | | | | 439/455 |
| 7,675,747 | B1 | * | 3/2010 | Ong | .................... | H05K 7/20727 |
| | | | | | | 361/679.48 |
| 7,941,196 | B2 | * | 5/2011 | Kawasaki | ............... | H04M 1/18 |
| | | | | | | 455/575.8 |
| 9,775,256 | B2 | * | 9/2017 | Garcia | ................. | H05K 5/0052 |
| 2002/0073504 | A1 | * | 6/2002 | Hall | ........................ | A47L 11/34 |
| | | | | | | 15/320 |
| 2004/0089570 | A1 | * | 5/2004 | Chien | ..................... | H04M 1/18 |
| | | | | | | 206/811 |

(Continued)

FOREIGN PATENT DOCUMENTS

DE 112012005398 B4 2/2020

*Primary Examiner* — April G Gonzales
(74) *Attorney, Agent, or Firm* — PERRY + CURRIER Inc.

(57) ABSTRACT

A portable communication device having an inner sealing surface forming contours around screw bosses is provided. The device comprises non-metallic housings that mate to form an interior. A first housing comprises: an inner sidewall forming a sealing surface extending around the inner sidewall; an outer sidewall opposing the inner sidewall; and screw bosses between the inner sidewall and the outer sidewall, the sealing surface extending into the interior in respective regions of the screw bosses to form respective contours around the screw bosses. A second housing comprises: a respective sidewall, adjacent to the sealing surface, an outer circumference of the respective sidewall complementary to the sealing surface; and a compressible seal extending around the outer circumference of the respective sidewall, the compressible seal compressing against the sealing surface and the respective contours to seal the interior from moisture. The device further comprises screws configured to mate with respective screw bosses.

14 Claims, 10 Drawing Sheets

(56) References Cited

U.S. PATENT DOCUMENTS

| | | | |
|---|---|---|---|
| 2009/0127872 A1* | 5/2009 | Ye | E05B 65/0864 |
| | | | 292/241 |
| 2010/0282427 A1* | 11/2010 | Jacques | B22D 11/113 |
| | | | 164/4.1 |
| 2014/0069786 A1* | 3/2014 | Werner | H01H 13/063 |
| | | | 156/160 |
| 2014/0086796 A1* | 3/2014 | Giraud | G01N 35/00029 |
| | | | 422/68.1 |
| 2019/0228927 A1* | 7/2019 | Teplitxky | H01H 13/06 |

* cited by examiner

DEVICE HAVING AN INNER SEALING SURFACE FORMING CONTOURS AROUND SCREW BOSSES

BACKGROUND OF THE INVENTION

Portable communication devices, such as portable handheld radios should generally be sealed against moisture, such as water, as well as dust. Such sealing may be challenging when one or more portions of a housing of a portable handheld radio are made from a non-metallic material.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Portable communication devices, such as portable handheld radios should generally be sealed against moisture, such as water, as well as dust. Such sealing may be challenging when one or more portions of a housing of a portable handheld radio is made from a non-metallic material. In particular, many portable handheld radios have rigid metal and/or aluminum rear housings, which may use tongue-and-groove catch features and a sealing-ring (e.g., O-ring) to assemble the rear metal housing to the front housing, which are further held together using screws inside a perimeter of the sealing-ring, and which may assist at sealing the device against moisture. However, such portable handheld radios may be heavy due to the metal, and hence other portable handheld radios may have rear housings made of non-metallic material, such as polycarbonate, and the like. While lighter than metal, such non-metallic housings may be more challenging to assemble in a manner that ensures moisture sealing as such non-metallic housings are generally more bendable than metallic housings. While tongue-and-groove catch features, O-rings and screws may be used to assemble such non-metallic housings, apertures through the non-metallic housings for such screws provide a path for moisture and dust. While further O-rings, that fit between heads of such screws and a surface of the device, may be used with such screws for sealing, such O-rings are tiny and inconvenient to assemble and furthermore may become points of failure for moisture to enter a portable handheld radio. Furthermore, tongue-and-groove catch features and/or sealing rings are susceptible to having their moisture sealing properties fail when a non-metallic housing is stressed and/or bent. Thus, there exists a need for an improved portable communication device and/or portable handheld radio with an inner sealing surface forming contours around screw bosses which are located between an inner sidewall, that forms the inner sealing surface, and an outer sidewall to provide moisture sealing and a sealing structure that is less susceptible to bending of non-metallic housings.

Hence, provided herein is a portable communication device (e.g., hereafter, the device) formed from two non-metallic housings. The device includes an inner sealing surface forming contours around screw bosses which are located between an inner sidewall, that forms the inner sealing surface, and an outer sidewall of a first housing (e.g., a front housing). A second housing includes a respective sidewall that is insertable into the first housing such that the respective sidewall is located adjacent the sealing surface and is shaped to be complementary to the sealing surface. The device further includes a compressible seal along the respective sidewall that compresses against the sealing surface to seal the device against moisture, dust etc.

Indeed, such an arrangement enables screws that attach a first and second housing of a portable handheld radio to be outside an outer circumference and/or outer perimeter of the sealing surface to obviate use of O-rings that fit between heads of screws and a surface of a device, and the like, with screws. Furthermore, as the sealing surface and compressible seal are inside the screw bosses, such a sealing structure may be less susceptible to breaches in moisture to to bending by the non-metallic housings.

Such an arrangement may further allow for such a device to be narrower than one that uses a sealing ring and screws with O-rings inside the sealing ring to attach first and second housings to each other. For example, as the sealing occurs via the compressible seal and the sealing surface at an inner sidewall, and as the screws and screw bosses are incorporated into the device between an outer sidewall and the inner sidewall, the device may be made narrower.

An aspect of the present specification provides a device comprising: a first housing and a second housing configured to mate with each other to form an interior, the first housing and the second housing comprising non-metallic material, the first housing comprising: an inner sidewall forming a sealing surface that extends around the inner sidewall: an outer sidewall opposing the inner sidewall: and one or more screw bosses between the inner sidewall and the outer sidewall, the sealing surface extending into the interior in respective regions of the one or more screw bosses to form respective contours around the one or more screw bosses: the second housing comprising: a respective sidewall, adjacent to the sealing surface, an outer circumference of the respective sidewall being complementary to the sealing surface; and a compressible seal that extends around the outer circumference of the respective sidewall, the compressible seal configured to compress against the sealing surface and the respective contours to seal the interior from moisture: and one or more screws configured to mate with respective screw bosses.

Each of the above-mentioned embodiments will be discussed in more detail below, starting with an example system and device architectures of the system in which the embodiments may be practiced.

Further advantages and features consistent with this disclosure will be set forth in the following detailed description, with reference to the figures.

Herein, the terms water and moisture are generally used interchangeably, such that "moisture" may refer to "water" and vice versa.

Figure 1A:
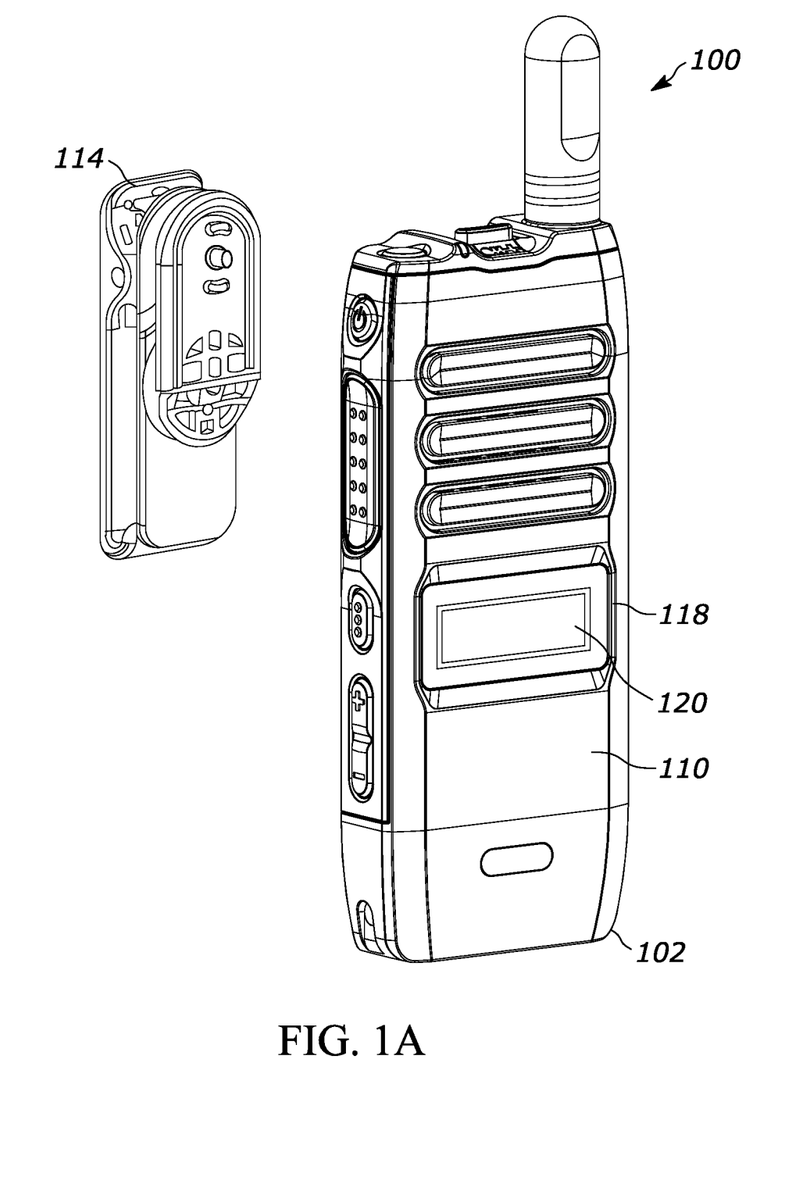
FIG. 1A is front perspective view of a portable communication device having an inner sealing surface forming contours around screw bosses: as depicted the device comprises a portable handheld radio that may include an attachment for a belt clip (as depicted, detached), at a rear housing, in accordance with some examples.
Figure 1B:
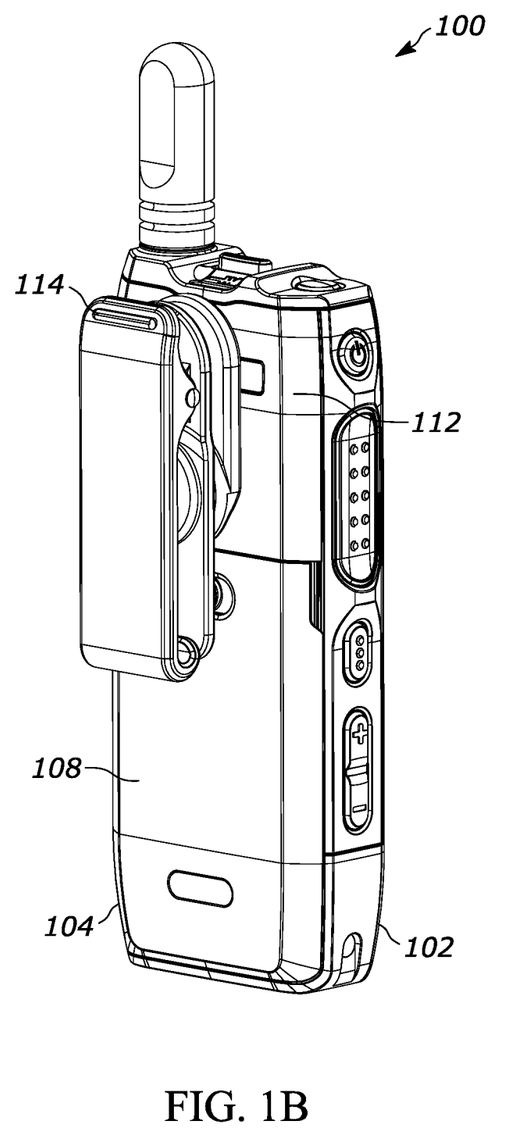
FIG. 1B is rear perspective view of the portable communication device of FIG. 1A, with the belt clip attached, in accordance with some examples.
Figure 2:
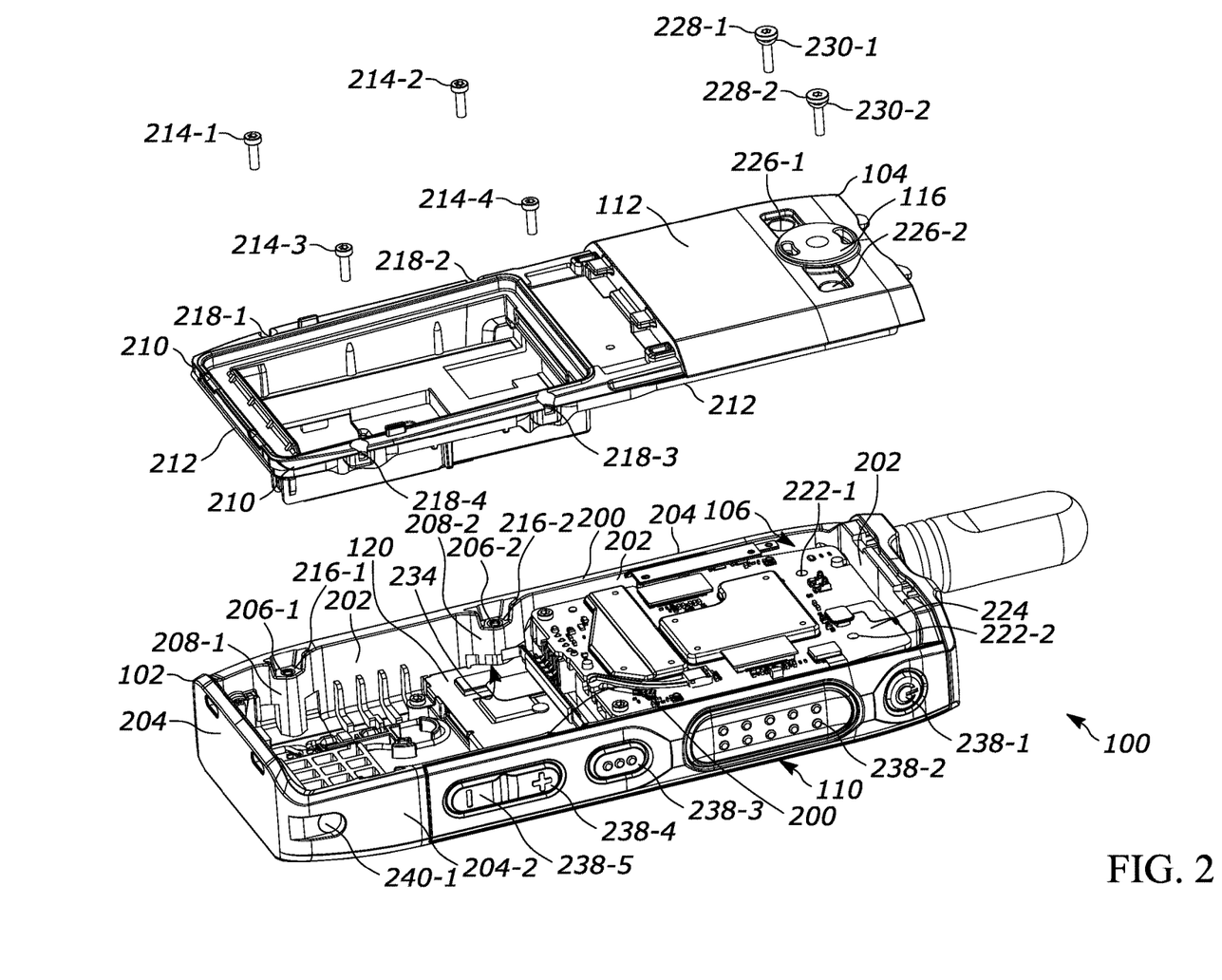
FIG. 2 is an exploded rear perspective view of the portable communication device of FIG. 1A, with a battery cover removed, in accordance with some examples.

Attention is first directed to FIG. 1A, FIG. 1B, and FIG. 2. FIG. 1A and FIG. 1B respectively depict front and rear perspective views of a portable communication device 100 in assembled state. FIG. 2 depicts an exploded rear perspective view of the device 100 (e.g., in an unassembled state). The portable communication device 100 is interchangeably referred to hereafter as the device 100.

The portable communication device 100 comprises a portable handheld radio, for example a portable public safety radio, for use by first responders, such as firefighters, and the like. However, the device 100 may include any suitable portable handheld radio, including, but not limited to a body-wearable portable handheld radio, a cell phone, a remote speaker microphone, and the like. For example, the device 100 may comprise a body-wearable portable handheld radio, and/or the device 100 may comprise a cell phone, and/or the device 100 may comprise a remote speaker microphone with a housing and/or housings, and the like, of the device 100 adapted accordingly.

In particular, the device 100 comprises a first housing 102 and a second housing 104 configured to mate with each other to form an interior 106 (as best seen in FIG. 2).

In general, the first housing 102 and the second housing 104 are formed from a non-metallic material, such as any suitable polycarbonate, plastic, and the like, or combination thereof: for example, the housings 102, 104 may be formed from more than one type of non-metallic material. As such the housings 102, 104 are understood to be less rigid than if the housings 102, 104 were formed from metal, and hence it is understood that the housings 102, 104 may be more bendable than if formed from metal.

Furthermore, as depicted, the first housing 102 may comprise a front housing and the second housing 104 may comprise a rear housing. However, the terms, "front" and "rear" (and/or "back") are understood to be generally non-limiting and as such, in some examples the first housing 102 may comprise a rear housing and the second housing 104 may comprise a front housing.

As best seen in FIG. 1B, the device 100 may include a battery cover 108 that attaches to the second housing 104 to allow a battery (not depicted) of the device 100 to be replaced. In FIG. 2, and the remaining figures, it is understood that the battery cover 108 has been removed for simplicity.

Furthermore, it is understood that the first housing 102 comprises a front wall 110, and the second housing 104 comprises a rear wall 112 opposing the front wall 110.

As best seen in FIG. 1A and FIG. 1B, the device 100 may be provided with an optional pressure mounted belt clip 114 (e.g., hereafter the belt clip 114), and, in such examples, as best seen in FIG. 2, the device 100 may include an attachment mechanism 116, for example located at the rear wall 112 of the second housing 104, to which the belt clip 114 may be attached, for example by applying pressure to the belt clip 114. In FIG. 1A, the belt clip 114 is unattached to the device 100, and in FIG. 1B, the belt clip 114 is attached to the device 100 via the second housing 104. It is understood, however, that the belt clip 114, and the attachment mechanism 116 are optional. In particular, when attached to the attachment mechanism 116, and/or as the belt clip 114 is being attached to the attachment mechanism 116, the belt clip 114 may place stress on the second housing 104 in a region of the attachment mechanism 116, which may cause the second housing 104 to twist and/or bend, for example when the belt attached to a belt (not depicted) and/or as the belt clip 114 is attached to, or removed from, the attachment mechanism 116.

As best seen in FIG. 1A, the device 100 further comprises an aperture 118 through the front wall 110 and a display device 120 visible through the aperture 118.

While a method of manufacture of the housings 102, 104 is generally understood to be non-limiting, in particular examples the housings 102, 104 may be manufactured via an injection molding process, which may introduce particular challenges, which are mitigated by certain features of the device 100 as described herein.

Attention is next directed to FIG. 2 which shows details of the first housing 102 and the second housing 104. Furthermore, FIG. 2 shows the first housing 102 and the second housing 104 disassembled from each other to show the interior 106. It is understood that some internal components of the device 100 are removed to show certain details of the first housing 102. However, it is further understood that the device 100 may include any suitable components (depicted or not depicted) to provide any suitable functionality, including, but no limited to, portable handheld radio functionality (e.g., transceivers, processors, an antenna, input devices, knobs, buttons, microphones, speakers and the like). Hence, components of the device 100 may be adapted according to any suitable functionality and/or configuration thereof.

In particular, the first housing comprises: an inner sidewall 200 forming a sealing surface 202 that extends around the inner sidewall 200; an outer sidewall 204 opposing the inner sidewall 200; and one or more screw bosses 206-1, 206-2, 206-3, 206-4 between the inner sidewall 200 and the outer sidewall 204, the sealing surface 202 extending into the interior 106 in respective regions of the one or more screw bosses 206-1, 206-2, 206-3, 206-4 to form respective contours 208-1, 208-2, 208-3, 208-4 around the one or more screw bosses 206-1, 206-2, 206-3, 206-4.

The one or more screw bosses 206-1, 206-2, 206-3, 206-4 are interchangeably referred to hereafter, collectively, as the screw bosses 206 and, generically, as a screw boss 206. This convention will be used throughout the present specification. For example, the respective contours 208-1, 208-2, 208-3, 208-4 are interchangeably referred to hereafter as the contours 208 and/or as a contour 208.

Furthermore, while the screw bosses 206-3, 206-4 and respective contours 208-3, 208-4 are not visible in FIG. 2 (e.g., due to the angle of perspective), the screw bosses 206-3, 206-4 and respective contours 208-3, 208-4 are visible in FIG. 4, described in further detail below.

The inner sidewall 200 and the outer sidewall 204 are furthermore understood to extend from the front wall 110 of the first housing 102, for example towards the rear wall 112 of the second housing 104.

The second housing 104 comprises: a respective sidewall 210 extending from the rear wall 112 of the second housing 104 towards the front wall 110 of the first housing 102.

Furthermore, when the device 100 is assembled, the respective sidewall 210 is adjacent to the sealing surface 202 and in particular it is understood that the respective sidewall 210 is adjacent to the sealing surface 202 fits inside the sealing surface 202 and/or the inner sidewall 200 of the first housing 102.

Furthermore, an outer circumference and/or outer perimeter of the respective sidewall 210 is generally complementary to the sealing surface 202. Put another way, a path around the outer circumference and/or outer perimeter of the respective sidewall 210 is generally complementary to a respective path around the inner circumference and/or inner perimeter of sealing surface 202.

The second housing 104 further comprises a compressible seal 212 that extends around the outer circumference and/or outer perimeter of the respective sidewall 210, the compressible seal 212 configured to compress against the sealing surface 202 and the respective contours 208 to seal the interior 106 from moisture.

For example, when the respective sidewall 210 of the second housing 104 is inserted into the first housing 102 adjacent the sealing surface 202 and/or the inner sidewall 200, the respective sidewall 210 and the inner sidewall 200 and/or the sealing surface 202 may be separated by a given distance, such as 0.5 mm, and/or any other suitable distance: furthermore, this distance may vary around the outer circumference and/or outer perimeter of the respective sidewall 210. The compressible seal 212 may extend outward from the respective sidewall 210 at a distance (and/or distances) that is greater than the distance (or distances) between the respective sidewall 210 and the inner sidewall 200 and/or the sealing surface 202, such as 0.7 mm, and/or any other suitable distance. Hence, when the respective sidewall 210 of the second housing 104 is inserted into the first housing 102 adjacent the sealing surface 202 and/or the inner sidewall 200, the compressible seal 212 compresses against the sealing surface 202. Furthermore, dimensions and/or a shape and/or a cross-section of the compressible seal 212 may be configured to facilitate such insertion and compression: for example the compressible seal 212 may generally have a rounded cross-section, and the like.

Details of a path of the compressible seal 212 compressed against the sealing surface 202 and the respective contours 208 to seal the interior 106 from moisture are described below with respect to FIG. 6A and FIG. 6B.

In some examples, the compressible seal 212 may comprise liquid silicone rubber (LSR) bonded to a polycarbonate and/or plastic material of the remainder of the second housing 104 in an injection molding process.

The device 100 further comprises one or more screws 214-1, 214-2, 214-3, 214-4 (e.g., screws 214 and/or a screw 214) configured to mate with respective screw bosses 206 and in particular nut inserts 216-1, 216-2, 216-3, 216-4 (e.g., inserts 216 and/or an insert 216) of respective screw bosses 206.

For example, the rear wall 112 of the second housing 104 generally includes respective apertures 218-1, 218-2, 218-3, 218-4 (e.g., apertures 218 and/or an aperture) and/or cutouts respectively located in the rear wall 112 at positions corresponding to respective screw bosses 206. Hence, a screw 214 may be inserted through a respective aperture 218 to mate with a respective insert 216 of a respective screw boss 206. The screws 214 may be tightened into a respective insert 216 to hold the housings 102, 104 together, with the compressible seal 212 compressing against the sealing surface 202 to seal the interior 106 of the device 100 against moisture, dust, and the like.

For example, as depicted, the screw 214-1 may be inserted through the aperture 218-1 to mate with the screw boss 206-1 (e.g., the insert 216-1 thereof). Similarly, the screw 214-2 may be inserted through the aperture 218-2 to mate with the screw boss 206-2 (e.g., the insert 216-2 thereof). Similarly, the screw 214-3 may be inserted through the aperture 218-3 to mate with the screw boss 206-3 (e.g., the insert 216-3 thereof). Similarly, the screw 214-4 may be inserted through the aperture 218-4 to mate with the screw boss 206-4 (e.g., the insert 216-4 thereof).

Furthermore, as the screw bosses 206, screws 214, inserts 216 and apertures 218 are generally located between the inner sidewall and the outer sidewall 204, and/or outside of the sealing surface 202 and the compressible seal 212, the screws 214 and screw bosses 206 may generally be provided without O-rings as the compressible seal 212 compressing against the sealing surface 202 provides sealing against moisture. Hence, use of O-rings is generally obviated by the depicted structure.

In general, the screw bosses 206 are understood to form a three-dimensional (3D) structure that extend into the interior of the device 100, for example to prevent the screw bosses 206 from being visible at an exterior of the device 100 and/or to prevent the screw bosses 206 from extending outward from the outer sidewall 204. As such, the inner sidewall and the sealing surface 202 are also 3D structures (e.g., not flat) that extend around the screw bosses 206 via the contours 208 (e.g., without sharp and/or 90° corners). The angles of the contours 208 may be any suitable non-90° angle that contains the screw bosses inserts 216 (e.g., and/or holes for the screw boss inserts 216, without the inserts 216 inserted) with a given (and/or uniform) thickness (e.g., to support the screw bosses inserts 216). Hence, the respective sidewall 210 and the compressible seal 212 are formed to be complementary to the sealing surface 202 to facilitate compression of the compressible seal 212 against the sealing surface 202 and to prevent gaps between the compressible seal 212 and the sealing surface 202 from occurring, which may also be facilitated by dimensions and/or a shape and/or a cross-section of the compressible seal 212.

Furthermore, while there are four screw bosses 206, contours 208, screws 214, inserts 216 and apertures 218, it is understood that the device 100 may include fewer than four screw bosses 206, contours 208, screws 214, inserts 216 and apertures 218 (e.g., as few as one screw boss 206, contour 208, screw 214, insert 216 and aperture 218) or more than four screw bosses 206, contours 208, screws 214, inserts 216 and apertures 218. However, it is understood that the more screw bosses 206, contours 208, screws 214, inserts 216 and apertures 218 at the device 100, the better the housings 102, 104 are held together and/or the better the seal between the compressible seal 212 and the sealing surface 202.

However, there may be particular stress placed on the second housing 104 in a region of the attachment mechanism 116 due to the belt clip 114 being attached, as described above. As such, use of the screw bosses 206, contours 208, screws 214, inserts 216 and apertures 218 in a region of the attachment mechanism 116 may not provide adequate sealing when the belt clip 114 is attached to the attachment mechanism.

Figure 3:
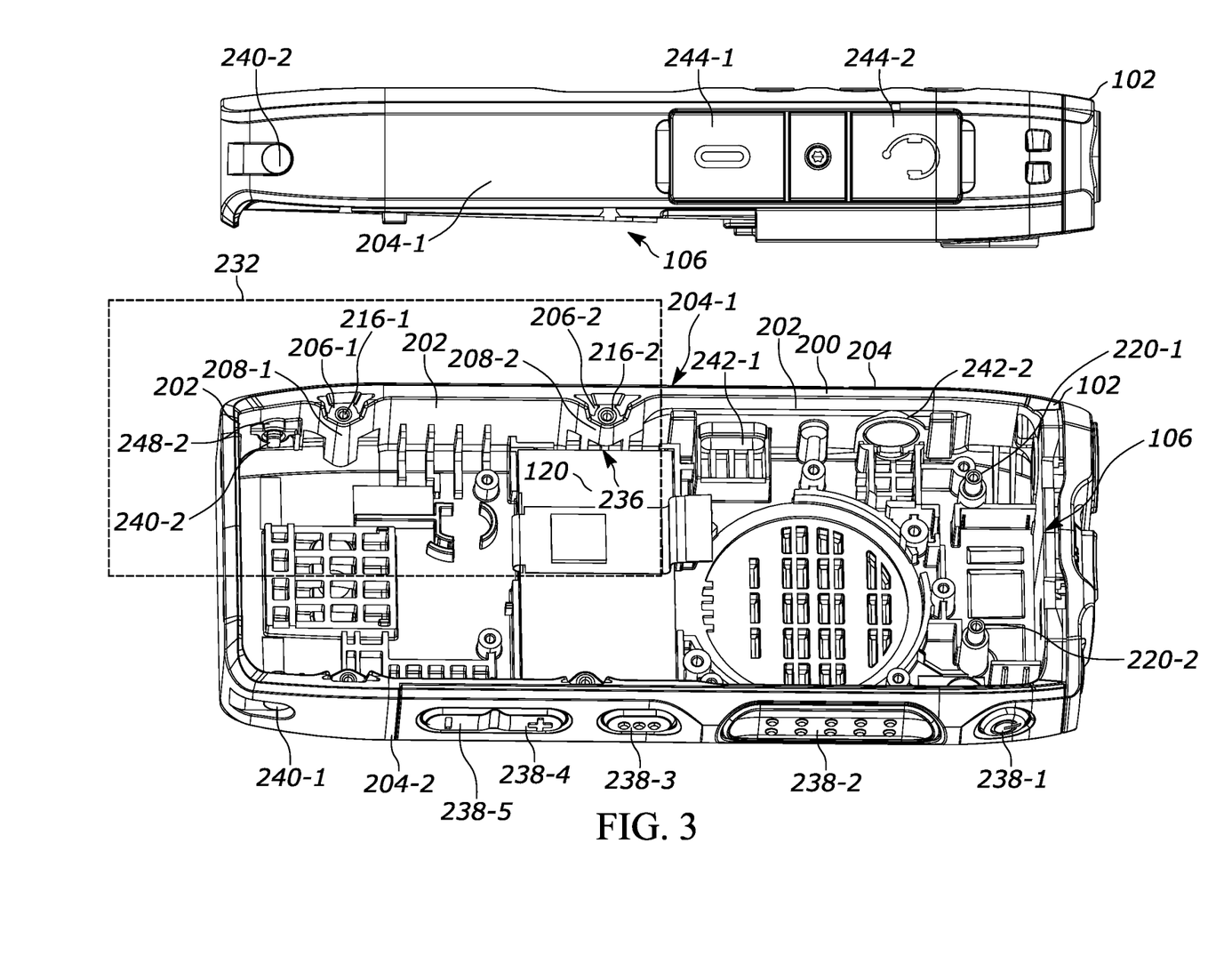
FIG. 3 shows perspective and side views of a first housing of the portable communication device of FIG. 1A, with internal components, other than a display device, removed, in accordance with some examples.
Figure 4:
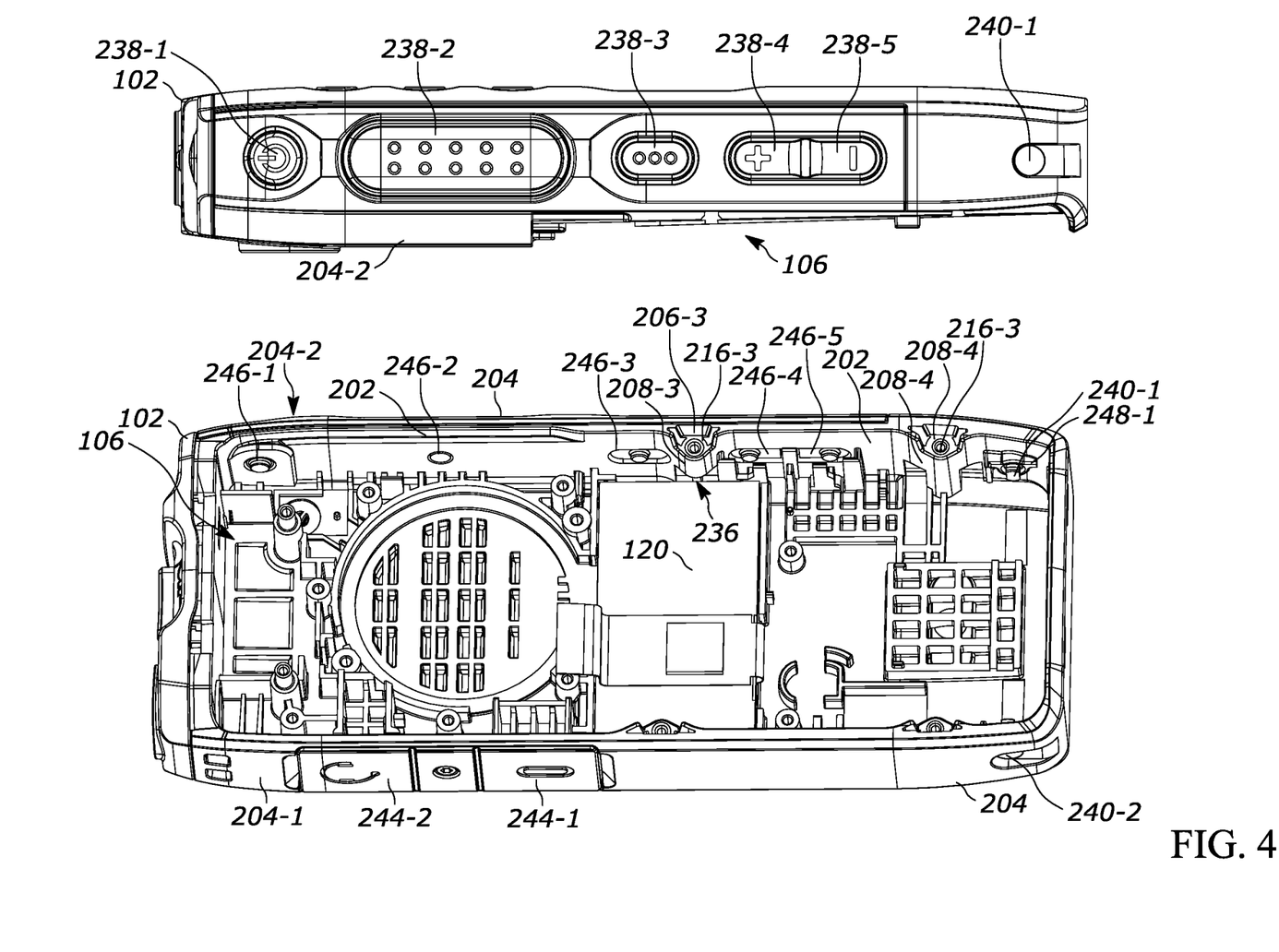
FIG. 4 shows perspective and side views of the first housing of the portable communication device of FIG. 1A, with internal components, other than a display device, removed, and from an opposite angle as that depicted in FIG. 3, in accordance with some examples.

Hence, attention is next directed to FIG. 2, as well as FIG. 3, and FIG. 4, which illustrate further additional features of the device 100.

In particular, a bottom portion of FIG. 3, depicts a perspective view of the first housing 102 but with further interior components removed. A top portion of FIG. 3 depicts a side view of the first housing 102, but inverted and rotated 180° relative to the bottom portion, such that the bottom and top portions of FIG. 3 shows opposite sides of the outer sidewall 204 of the first housing 102.

Similarly, a bottom portion of FIG. 4, depicts a perspective view of the first housing 102 but with further interior components removed, from an opposite side as that of FIG. 3. A top portion of FIG. 4 depicts a side view of the first housing 102, but inverted and rotated 180° relative to the bottom portion, such that the bottom and top portions of FIG. 4 shows opposite sides of the outer sidewall 204 of the first housing 102. For clarity the opposite sides of the outer sidewall 204 are labelled as sides 204-1, 204-2 in FIG. 2, FIG. 3 and FIG. 4. The screw bosses 206-1, 206-2 are understood to be located between the inner sidewall 200 and the side 204-1 of the outer sidewall 204, and the screw bosses 206-3, 206-4 are understood to be located between the inner sidewall 200 and the side 204-2 of the outer sidewall 204.

As FIG. 3 and FIG. 4 illustrate, the device 100 may further comprise: one or more additional screw bosses 220-1, 220-2 (e.g., additional screw bosses 220 and/or an additional screw boss 220) extending from an inner surface of the front wall 110 of the first housing 102 within the interior 106 and within the sealing surface 202. While the additional screw bosses 220 are not visible in FIG. 2, the additional screw bosses 220 are understood to be located behind respective apertures 222-1, 222-2 (e.g., apertures 222 and/or an aperture 222) of a printed circuit board (PCB) 224 in the interior 106. The PCB 224 is understood to be removed in FIG. 3 and FIG. 4 to better show the additional screw bosses 220.

In these examples, with reference to FIG. 2, the device 100 further comprises one or more apertures 226-1, 226-2 (e.g., apertures 226 and/or an aperture 226) in the rear wall 112, of the second housing 104, opposite respective additional screw bosses 220. Also with reference to FIG. 2, the device 100 further comprises one or more additional screws 228-1, 228-2 configured to extend through respective apertures 226 in the rear wall 112, to mate with the respective additional screw bosses 220.

For example, as depicted, the device 100 comprises two screws 228, and the screw 228-1 may be inserted through the aperture 226-1 (e.g., and the aperture 222-1 in the PCB 224) to mate with the screw boss 220-1. Similarly, the screw 228-2 may be inserted through the aperture 226-2 (e.g., and the aperture 222-2 in the PCB 224) to mate with the screw boss 220-2.

Furthermore, as the screw bosses 220, apertures 226 and screws 228 are inside the circumference and/or perimeter of the sealing surface 202, and/or the compressible seal 212, the apertures 226 and the screws 228 may act as paths for moisture and/or dust to enter the device 100. As such, as depicted, the device 100 may comprise one or more sealing rings 230-1, 230-2, (e.g., sealing rings 230 and/or a sealing ring 230) that reside between a respective head of a respective additional screw 228 and a respective outer surface of the rear wall 112 adjacent a respective aperture 226, for example to provide a seal against moisture and/or dust, and the like. The sealing rings 230 may comprise respective O-rings.

Furthermore, as depicted the device 100 comprises two screw bosses 220, apertures 226, screws 228 and sealing rings 230 are depicted, for example a set of a screw boss 220, an aperture 226, a screw 228 and a sealing ring 230 on either side of the attachment mechanism 116, between the attachment mechanism 116 and a respective side 204-1, 204-2 of the outer sidewall 204. Such an arrangement may cause the screw bosses 220 and screws 228 to mitigate and/or absorb stress applied by the attachment mechanism 116 to the housings 102, 104, when the belt clip 114 is attached thereto, for example to prevent the regions of the housings 102, 104 adjacent the attachment mechanism 116, that include the sealing surface 202 and the compressible seal 212, from bending and risking breaching a seal between the sealing surface 202 and the compressible seal 212. However, the device 100 may comprise any suitable number of screw bosses 220, apertures 226, screws 228 and sealing rings 230.

Indeed, a number of sets of screw bosses 206, contours 208, screws 214, inserts 216 and apertures 218, and an arrangement thereof, and a number of sets of screw bosses 220, apertures 226, screws 228 and sealing rings 230, and an arrangement thereof, may be selected to ensure adequate sealing of the device 100. For example, when the attachment mechanism 116 is absent the sets of screw bosses 220, apertures 226, screws 228 and sealing rings 230 may be replaced by a suitable number of screw bosses 206, contours 208, screws 214, inserts 216 and apertures 218, for example spaced between the inner sidewall 200 and the outer sidewall 204.

Similarly, in some examples, the device 100 may further comprise the pressure mounted belt clip 114 and attachment mechanism 116 therefor, and an arrangement of one or more additional screw bosses 220 extending from an inner surface of the front wall 210 within the interior 106 and within the sealing surface 202, and one or more additional screws 228 configured to extend through respective apertures 218 in the rear wall 112 to mate with the respective additional screw bosses 220, the arrangement configured to absorb stress applied to the attachment mechanism 116 by the pressure mounted belt clip 114.

Figure 7A:
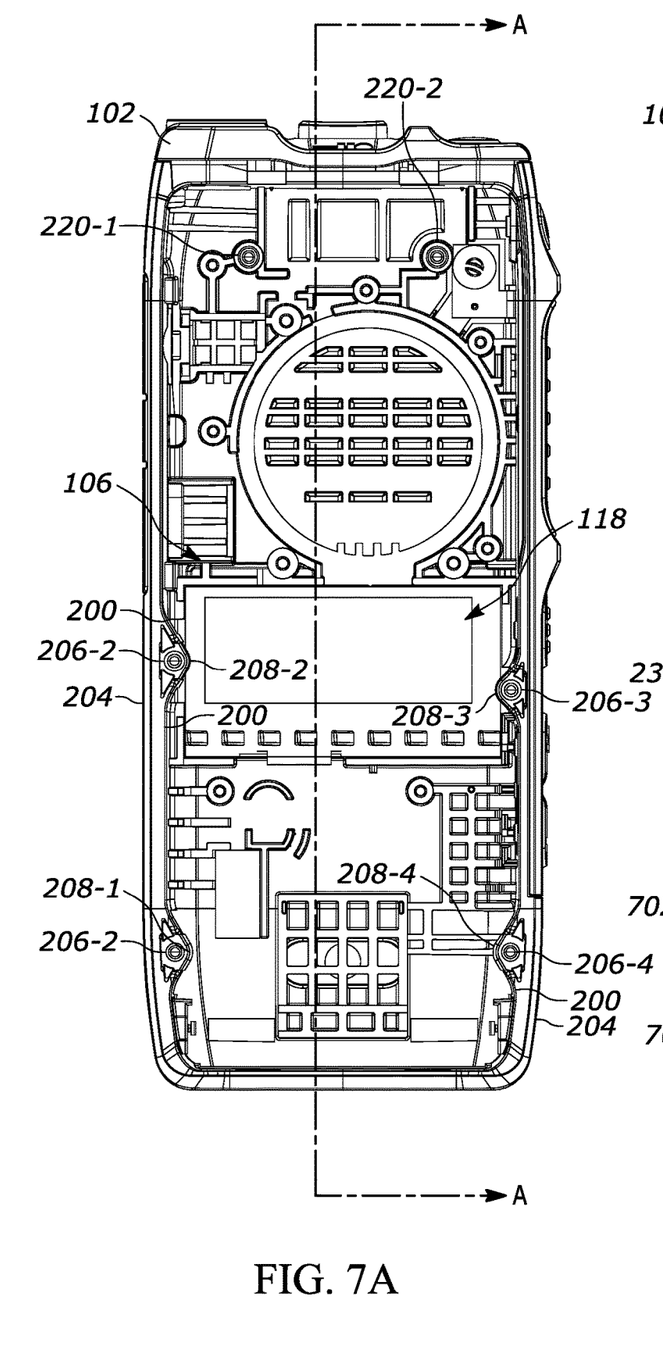
FIG. 7A is a plan view of the first housing of the portable communication device of FIG. 1A, in accordance with some examples.

As depicted there are four sets of screw bosses 206, contours 208, screws 214, inserts 216 and apertures 218, for example arranged around an end of the device 100 that is opposite an end where the attachment mechanism 116 is located. In particular, the four sets of screw bosses 206, contours 208, screws 214, inserts 216 and apertures 218 are arranged in relation with to aperture 118 and the display device 120 as best depicted in FIG. 7A described below.

Attention is next directed to both FIG. 2, FIG. 3, FIG. 4 and FIG. 5 in which further aspects of the device 100 are depicted. In particular, FIG. 5 details of a region 232 indicated in FIG. 3.

Figure 5:
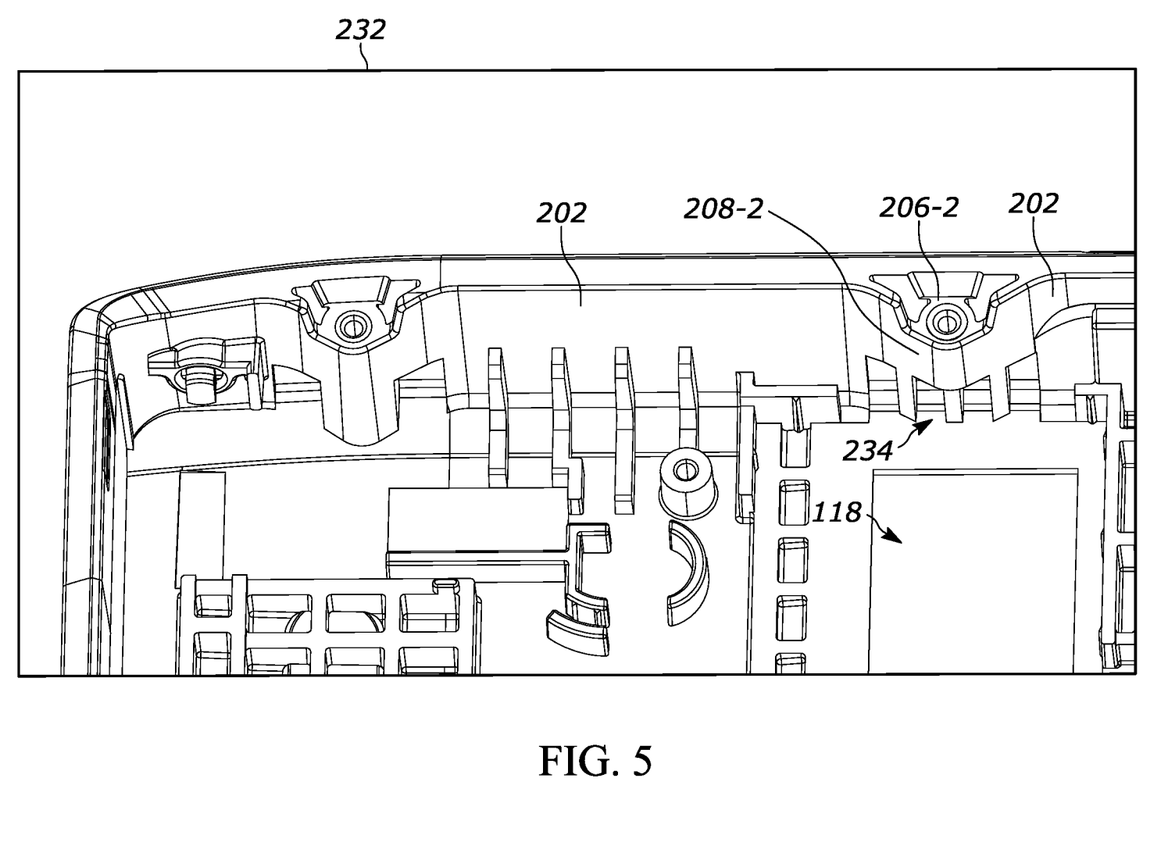
FIG. 5 shows detail of a region of FIG. 3, with the display device removed to show an aperture, in accordance with some examples.

Furthermore, it is understood that FIG. 2 depicts a rear side of the display device 120, FIG. 3 and FIG. 4 also depicts the rear side of the display device 120 with a backplate removed therefrom (e.g., the backplate is visible in FIG. 2), and FIG. 5 depicts the device 100 with the display device 120 removed to show the aperture 118. While the aperture 118 is not visible in FIG. 2, FIG. 3, and FIG. 4, the aperture 118 is understood to be "under" the display device 120.

In particular, FIG. 2, FIG. 3, FIG. 4 and FIG. 5 illustrate that two screw bosses 206-2, 206-3, of the one or more screw bosses 206, may be located at opposite sides of the inner sidewall 200 and the aperture 118. Furthermore, as depicted, the device 100 further comprises respective undercuts 234, 236 in the two screw bosses 206-2, 206-3 and the respective contours 208-2, 208-3 (of the sealing surface 202 around the two screw bosses 206-2, 206-3). For example, as best seen in FIG. 2, FIG. 3, and FIG. 5, the undercut 234 comprises an absence of material and/or a gap between the screw boss 206-2 and an inner surface of the front wall 110. Similarly, as best seen in FIG. 4, the undercut 236 comprises an absence of material and/or gap between the screw boss 206-3 and an inner surface of the front wall 110.

In particular, the respective undercuts 234, 236 are generally configured to engage the display device 120 therebetween for viewing through the aperture 118. For example, comparing FIG. 3 and FIG. 4, the respective undercuts 234, 236 are understood to oppose each other, and/or be located at opposing sides of the aperture 118, such that opposite ends of the display device 120 may be placed in the respective undercuts 234, 236 to hold the display device 120 in place. For example, as the first housing 102 is non-metallic and maybe be bendable, the first housing 102 may be partially bent to assist with "snapping" the display device 120 into the undercuts 234, 236. It is hence understood that the term "bendable" may include the housings 102, 104 being bendable when a force is applied thereto, but returning to an initial shape when the force is removed.

The undercuts 234, 236 may provide further advantages, for example when the first housing 102 is manufactured using injection molding techniques. In particular, as the undercuts 234, 236 generally reduce a thickness between the inner sidewall 200 and the outer sidewall 204 in a region of the screw bosses 206-2, 206-3, the undercuts 234, 236 may generally prevent sink marks from occurring, especially in the outer sidewall 204. For example, thicker regions of pieces formed using injection molding techniques may result in uneven cooling, which may lead to the walls in those regions "sinking" into the warmer core of the region causing unwanted indentations (e.g., sink marks), which may also cause mechanical issues with such regions. For example, if the outer sidewall 204 of the device 100 included sink marks, such sink marks might be different for instances of the device 100, which may cause some instances of the device 100 to be less compatible with cases that hold the device 100, for example. Put another way, due to the undercuts 234, 236, and the like, a thickness between the inner sidewall 200 and the outer sidewall 204 (e.g., including the screw bosses 206 and/or a thickness of walls of the screw bosses 206) may be at about a uniform thickness. In particular, due to the undercuts 234, 236, and the like, a thickness between the inner sidewall 200 and the outer sidewall 204 (e.g., including the screw bosses 206 and/or a thickness of walls of the screw bosses 206) may be at about a uniform thickness without sink marks.

From FIG. 2, FIG. 3, FIG. 4 and FIG. 5, it is further apparent that the screw bosses 206 and/or contours 208 may include further undercuts (e.g., between respective screw bosses 206-1, 206-2 and/or contours 208-1, 208-4 and an inner surface of the front wall 110), for example to generally reduce a thickness between the inner sidewall 200 and the outer sidewall 204 in a region of the screw bosses 206 to prevent sink marks from occurring in those regions. While such other undercuts may also be used to hold internal components of the device 100, as depicted, such undercuts are used only to prevent sink marks. When the first housing 102 is manufactured using techniques other than injection molding, such undercuts may be omitted unless functionally used to hold internal components of the device 100.

Such sink marks may be mitigated in other ways. For example, while as depicted the inserts 216 are cylindrical, and/or round in cross-section, in other examples the inserts 216 may be square and/or triangular in cross-section for example to reduce a thickness between the inner sidewall 200 and the outer sidewall 204 and/or provide better uniformity to a thickness between the inner sidewall 200 and the outer sidewall 204.

Attention is next directed to FIG. 2, FIG. 3, FIG. 4 which depict yet further aspects of the device 100.

In particular, the device 100 may comprise any suitable combination of buttons, charging pins, ports and the like, located, for example at the outer sidewall 204, or through the outer sidewall 204 and the inner sidewall 200, of the first housing 102.

For example, as depicted, the device 100 may comprise a power button 238-1, a push-to-talk button 238-2, a menu button 238-3 (e.g., to navigate a menu system rendered at the display device 120), and volume buttons 238-4, 238-5 (e.g., buttons 238 and/or a button 238), two charging pins 240-1, 240-2 (e.g., charging pins 240 and/or a charging pin 240), and a USB (universal serial bus) ports 242-1 and a headphone port 242-2 (e.g., ports 242 and/or a port 242 comprising apertures through the through the outer sidewall 204 and the inner sidewall 200) protected by respective moveable flaps and/or covers 244-1, 244-2 (e.g., covers 244 and/or a cover 244).

An inner portion of the buttons 238 are understood to extend through respective apertures 246-1, 246-2, 246-3, 246-4, 246-5 (e.g., apertures 246 and/or an aperture 246) through the outer sidewall 204 and the inner sidewall 200.

Similarly the charging pins 240 are understood to extend through respective apertures 248-1, 248-2 (e.g., apertures 248 and/or an aperture 248) through the outer sidewall 204 and the inner sidewall 200.

In general, as the ports 242 and the apertures 246, 248 are through the outer sidewall 204 and the inner sidewall 200, the ports 242 and the apertures 246, 248 are also through the sealing surface 202. As such, it is understood that the sealing surface 202, portions of the respective sidewall 210 in regions of the ports 242 and the apertures 246, 248, and the compressible seal 212 are generally adapted to avoid the ports 242 and the apertures 246, 248 and/or accommodate the ports 242 and the apertures 246, 248.

For example, around a circumference and/or perimeter of the sealing surface 202, the sealing surface 202 may include a path that is uninterrupted by the ports 242 and the apertures 246, 248, and the respective sidewall 210 may comprise a respective complementary uninterrupted path around which the compressible seal 212 is located.

Put another way, device 100 may further comprise: one or more apertures 246, 248 and/or ports 242 through the outer sidewall 204 and the inner sidewall 200 of the first housing 102, and the sealing surface 202, the respective sidewall 210, and the compressible seal 212 may be adapted to avoid the one or more apertures 246, 248 and/or ports 242.

Put yet another way, in specific examples, the device 100 may further comprise: one or more apertures 246 through the outer sidewall 204 and the inner sidewall 200 of the first housing 102: and one or more buttons 238 extending through respective apertures 246 from the outer sidewall 204 to the inner sidewall 200; the sealing surface 202, the respective sidewall 210, and the compressible seal 212 may be adapted to avoid the one or more apertures 246 and interior components of the one or more buttons 238 which extend through the apertures 246 (e.g., as best seen in FIG. 4).

Put yet another way, in yet further specific examples, the device 100 may further comprise: at least two charging pins 240 through the outer sidewall 204 and the inner sidewall 200 of the first housing 102, and the sealing surface 202, the respective sidewall 210, and the compressible seal 212 may be adapted to avoid the at least two charging pins 240.

Figure 6A:
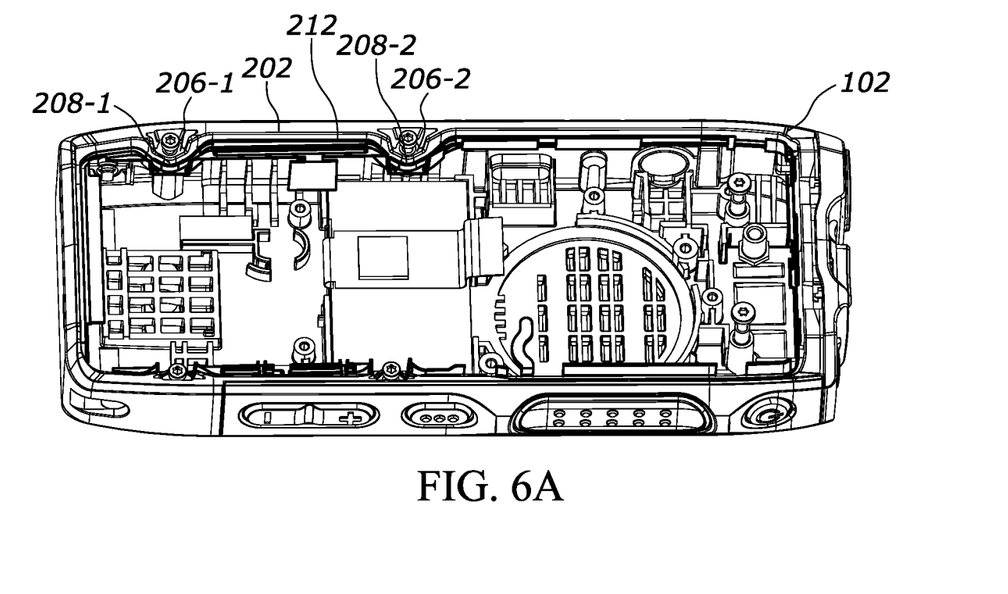
FIG. 6A is a perspective view of the first housing of the portable communication device of FIG. 1A, depicted with a location of the compressible seal of the second housing, in accordance with some examples.
Figure 6B:
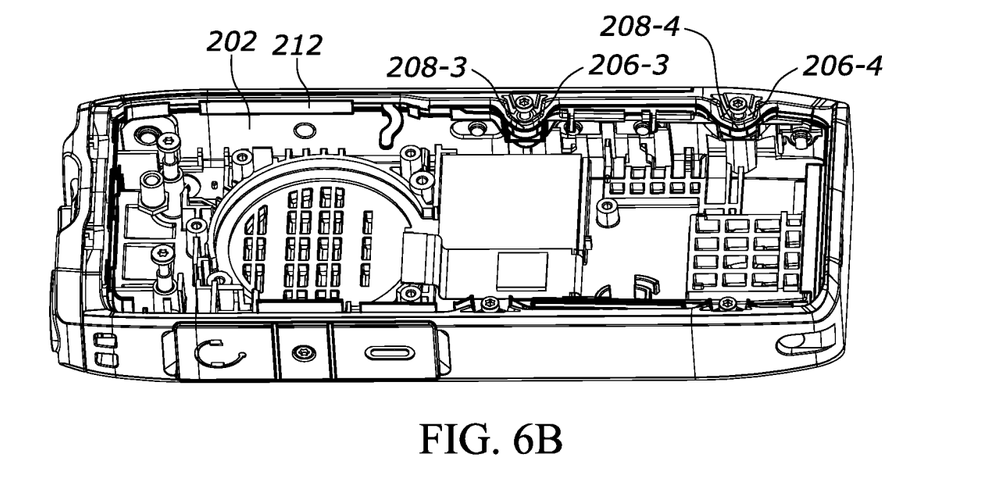
FIG. 6B is another perspective view of the first housing of the portable communication device of FIG. 1A, depicted with a location of the compressible seal of the second housing, in accordance with some examples.

Indeed, attention is next directed to FIG. 6A and FIG. 6B which respectively depicts perspective views of the first housing 102, similar to as respectively depicted in the bottom portions of FIG. 3 and FIG. 4, however with the compressible seal 212 depicted against the sealing surface 202, but without the remainder of the second housing 104 depicted. In FIG. 6A and FIG. 6B, the compressible seal 212 is outlined in a heavier line, relative to components of the first housing 102, to better show the position and/or the configuration of the compressible seal 212 relative to the components of the first housing 102.

In particular, it is apparent from FIG. 6A and FIG. 6B that the compressible seal 212 forms a continuous seal against the sealing surface 202 and furthermore follows the contours 208 of the screw bosses 206 as well as avoids the various apertures and ports etc. FIG. 6A and FIG. 6B further illustrate that dimensions and/or a shape and/or a cross-section of the compressible seal 212 may vary. FIG. 6A and FIG. 6B further illustrate, along with FIG. 3 and FIG. 4, that the inner sidewall 200 and/or the sealing surface 202 may include ridges and/or shelves and/or grooves, and the like, which the sealing surface 202 may reside on and/or in when the housings 102, 104 are mated.

FIG. 6A and FIG. 6B further depicts details of a path of the compressible seal 212 compressed against the sealing surface 202 and the respective contours 208 to seal the interior 106 from moisture. In particular, the compressible seal 212 compressed against the sealing surface 202 around the entirety of the sealing surface 202.

Attention is next directed to FIG. 7A which depicts a plan view of an interior of the first housing 102 with internal components removed, including the display device 120, to show the positions of the screw bosses 206 relative to the aperture 118. Furthermore, FIG. 7A further shows that the screw bosses 206 extend into the interior 106 of the device 100, and that the contours 208 are around the screw bosses 206.

FIG. 7A further shows that the screw bosses 206-2, 206-3 are on opposite sides of the aperture 118, but that the screw bosses 206-2, 206-3 may not specifically be directly opposed to each other.

FIG. 7A further shows that the additional screw bosses 220-1, 220-2 relative to the screw bosses 206.

Figure 7B:
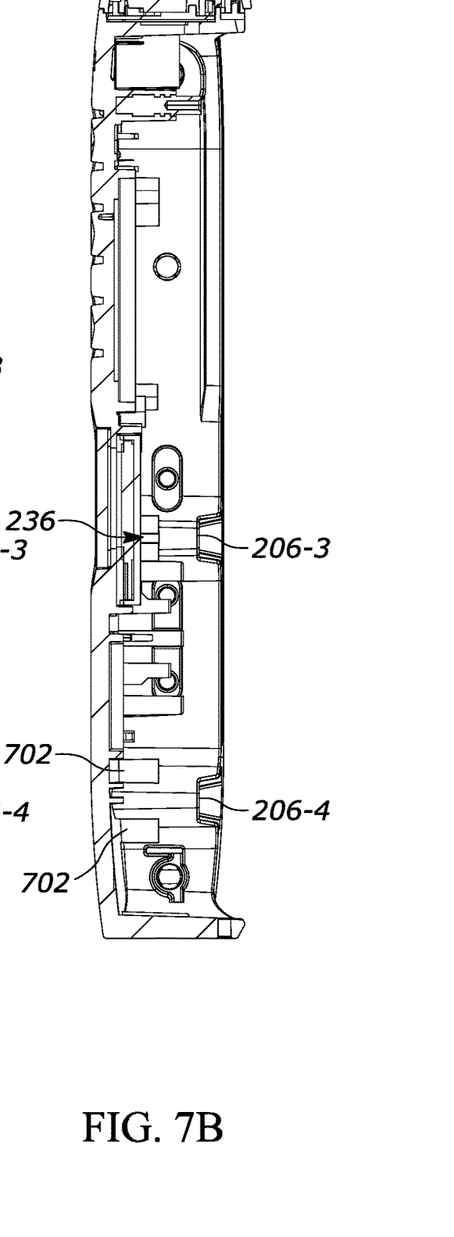
FIG. 7B is a cross-section of the first housing through a line A-A of FIG. 7A, in accordance with some examples.

Attention is next directed to FIG. 7B which depicts a cross-section of the first housing 102 through a line A-A of FIG. 7A. In particular, FIG. 7B shows further detail of the undercut 236 of the screw boss 206-3, as well as other undercuts 702 of the screw boss 206-4.

Figure 8A:
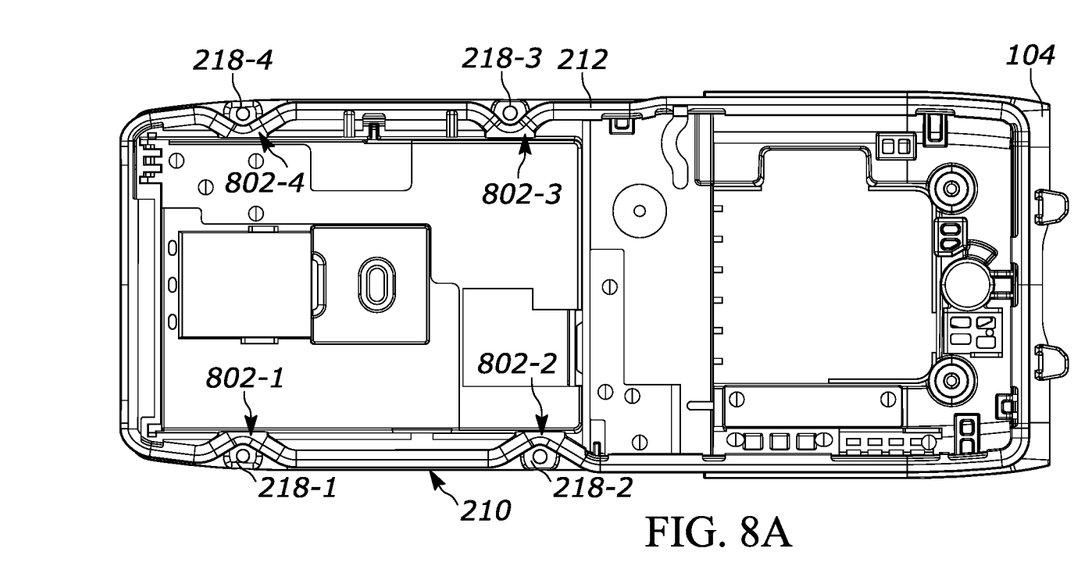
FIG. 8A is a plan view of the second housing of the portable communication device of FIG. 1A, in accordance with some examples.
Figure 8B:
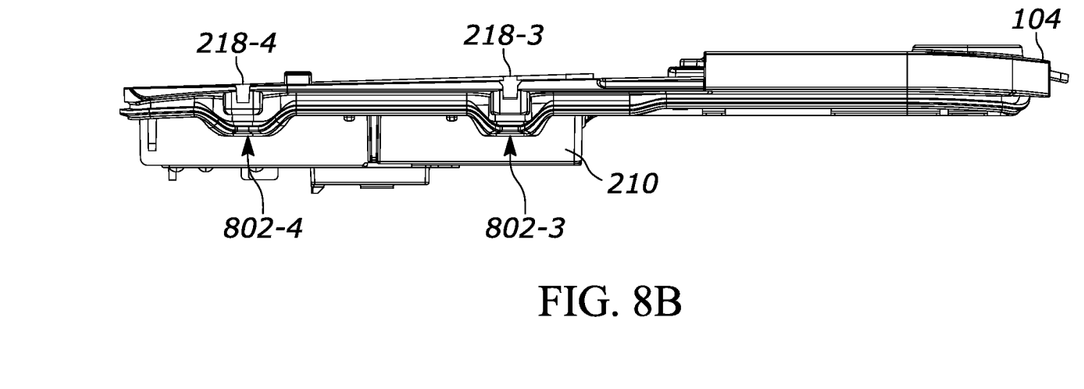
FIG. 8B is a side view of the second housing, in accordance with some examples.

Attention is next directed to FIG. 8A and FIG. 8B which respectively depict a plan view of an interior of the second housing 104, and a side view of the second housing 104, to show the positions of the apertures 218, and to further show portions 802-1, 802-2, 802-3, 802-4 of the compressible seal 212 and the respective sidewall 210 that are shaped complementary to the sealing surface 202 in the regions of the contours 208 such that the compressible seal 212 seals against the sealing surface 202.

Figure 9A:
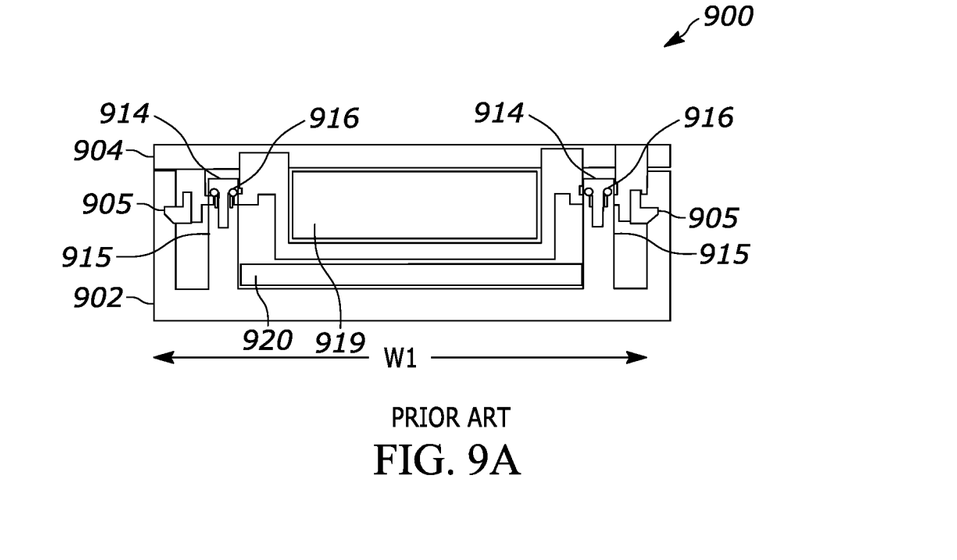
FIG. 9A is a schematic view of a prior art device, in accordance with some examples.
Figure 9B:
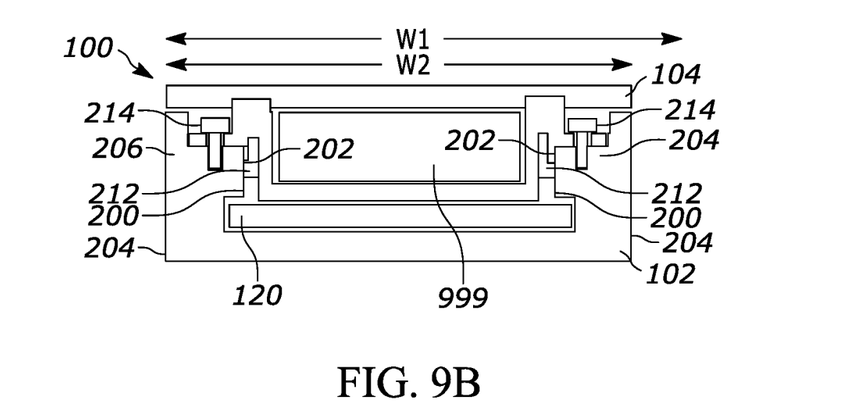
FIG. 9B is a schematic view of the portable communication device having an inner sealing surface forming contours around screw bosses, in accordance with some examples.

Attention is next directed to FIG. 9A and FIG. 9B which respectively depict schematic cross-sections of prior art device 900 and the presently provided device. In particular, FIG. 9A shows that two housings 902, 904 of the prior art device 900 are held together using screws 924 that are inside a perimeter of a sealing ring 905 such that the two housings 902, 904 are held in place by two or more screws 914, two or more screw bosses 915 and two or more O-rings 916, and the sealing ring 905: the sealing ring 905 and the O-rings 916 are understood to provide sealing against moisture. While tongue-and-groove catch features are not depicted in FIG. 9A, tongue-and-groove catch features may be present, for example at one or more ends of the prior art device 900 that are "in" and/or "out" of the page of FIG. 9A. Furthermore, two or more screws 914, two or more screw bosses 915 and two or more O-rings 916 are located between an inner circumference and/or inner perimeter of the sealing ring 905 and a remainder of an interior of the prior art device 900, that may include a battery 919 and a display device 920. As such, a width W1 of the prior art device 900 is selected to accommodate the sealing ring 905 and the screws 914, screw bosses 915 and O-rings 916 between an inner circumference and/or inner perimeter of the sealing ring 905 and a remainder of an interior of the prior art device 900.

In contrast, as depicted in FIG. 9B (depicted with a battery 999), as the present device 100 incorporates the screw bosses 206, and hence the screws 214, between the inner sidewall 200 and the outer sidewall 204, and as the compressible seal 212 and the sealing surface 202 are inside the inner sidewall 200, the present device 100 may be made more compact than the prior art device 900. As such, a width W2 of the present device 100 may be narrower than the width W1 of the prior art device 900. In particular, the width W1 of the prior art device 900 is compared to the width W2, with the width W2 of the present device 100 being smaller than the width W1 of the prior art device 900.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, front and rear, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

Similarly, in this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communication device comprising:
   a first housing and a second housing configured to mate with each other to form an interior, the first housing and the second housing comprising non-metallic material,
   the first housing comprising:
   an inner sidewall forming a sealing surface that extends around the inner sidewall;
   an outer sidewall opposing the inner sidewall; and
   one or more screw bosses between the inner sidewall and the outer sidewall, the sealing surface extending into the interior in respective regions of the one or more screw bosses to form respective contours around the one or more screw bosses;
   the second housing comprising:
   a respective sidewall, adjacent to the sealing surface, an outer circumference of the respective sidewall being complementary to the sealing surface; and
   a compressible seal that extends around the outer circumference of the respective sidewall, the compressible seal configured to compress against the sealing surface and the respective contours to seal the interior from moisture; and
   one or more screws configured to mate with respective screw bosses.

2. The portable communication device of claim 1, wherein the first housing comprises a front wall, and the second housing comprises a rear wall opposing the front wall, the inner sidewall and the outer sidewall extending from the front wall of the first housing towards the rear wall, and the respective sidewall extending from the rear wall of the second housing towards the front wall.

3. The portable communication device of claim 1, further comprising:
   a front wall of the first housing, the inner sidewall and the outer sidewall extending from the front wall;
   an aperture in the front wall;
   two screw bosses, of the one or more screw bosses, located at opposite sides of the inner sidewall and the aperture; and
   respective undercuts in the two screw bosses and the respective contours of the sealing surface around the two screw bosses, the respective undercuts configured to engage a display device therebetween for viewing through the aperture.

4. The portable communication device of claim 1, further comprising:
   one or more apertures through the outer sidewall and the inner sidewall of the first housing,
   wherein the sealing surface, the respective sidewall, and the compressible seal are adapted to avoid the one or more apertures.

5. The portable communication device of claim 1, further comprising:
   one or more apertures through the outer sidewall and the inner sidewall of the first housing; and one or more buttons extending through respective apertures from the outer sidewall to the inner sidewall, wherein the sealing surface, the respective sidewall, and the compressible seal are adapted to avoid the one or more apertures and interior components of the one or more buttons.

6. The portable communication device of claim 1, further comprising:

at least two charging pins through the outer sidewall and the inner sidewall of the first housing, wherein the sealing surface, the respective sidewall, and the compressible seal are adapted to avoid the at least two charging pins.

7. The portable communication device of claim 1, further comprising:

a front wall of the first housing, the inner sidewall and the outer sidewall extending from the front wall;

a rear wall of the second housing opposing the front wall;

one or more additional screw bosses extending from an inner surface of the front wall within the interior and within the sealing surface;

one or more apertures in the rear wall opposite respective additional screw bosses;

one or more additional screws configured to extend through respective apertures in the rear wall, to mate with the respective additional screw bosses; and one or more sealing rings that reside between a respective head of a respective additional screw and a respective outer surface of the rear wall adjacent a respective aperture.

8. The portable communication device of claim 1, wherein the non-metallic material comprises one or more of plastic and polycarbonate.

9. The portable communication device of claim 1, wherein the compressible seal comprises liquid silicone rubber bonded to the non-metallic material of the second housing.

10. The portable communication device of claim 1, wherein the portable communication device comprises a portable handheld radio.

11. The portable communication device of claim 1, further comprising a pressure mounted belt clip.

12. The portable communication device of claim 1, further comprising a pressure mounted belt clip and an attachment mechanism therefor, and an arrangement of one or more additional screw bosses extending from an inner surface of the front wall within the interior and within the sealing surface, and one or more additional screws configured to extend through respective apertures in the rear wall to mate with the respective additional screw bosses, the arrangement configured to absorb stress applied to the attachment mechanism by the pressure mounted belt clip.

13. The portable communication device of claim 1, wherein a thickness between the inner sidewall and the outer sidewall is at about a uniform thickness.

14. The portable communication device of claim 1, wherein a thickness between the inner sidewall and the outer sidewall is at about a uniform thickness without sink marks.

* * * * *